Dec. 23, 1941.  M. E. MITCHELL  2,266,786
AUTOMOBILE PARKING MECHANISM
Filed Feb. 26, 1938
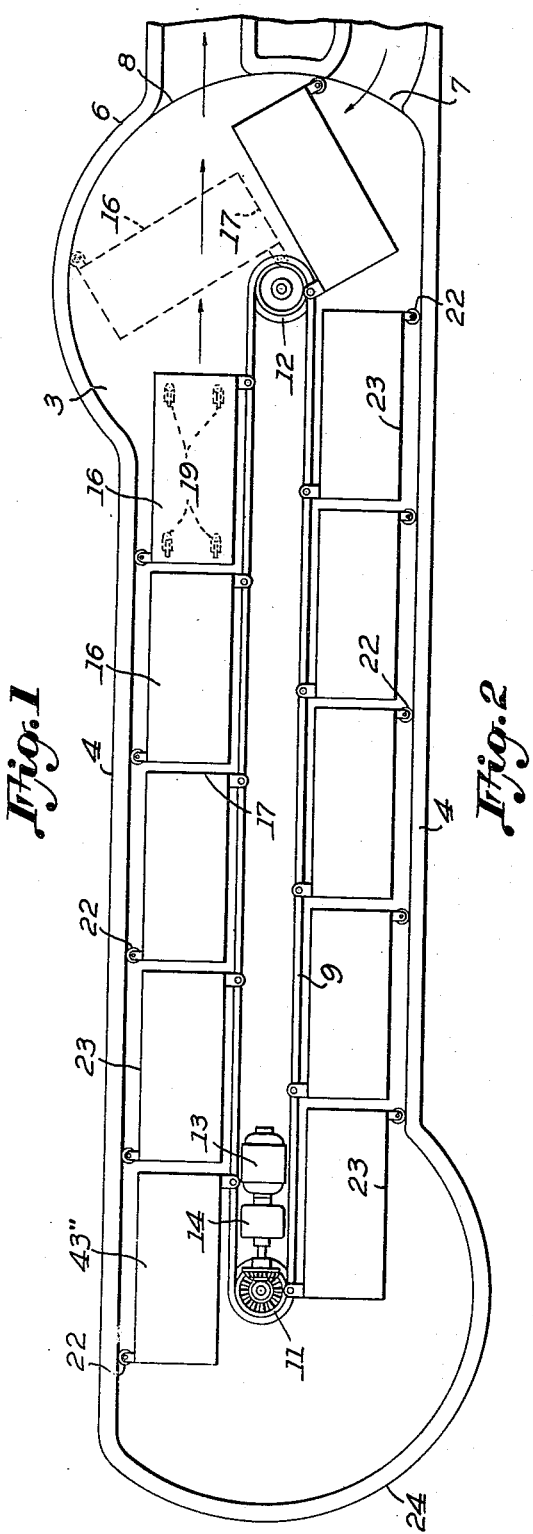
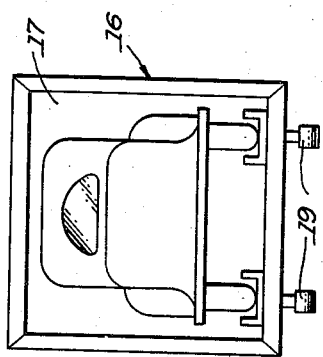
Inventor:
MALCOLM E. MITCHELL
By Joseph B. Gardner
his Attorney.

Patented Dec. 23, 1941

2,266,786

UNITED STATES PATENT OFFICE 2,266,786

AUTOMOBILE PARKING MECHANISM

Malcolm E. Mitchell, Oakland, Calif.

Application February 26, 1938, Serial No. 192,753

2 Claims. (Cl. 214—16.1)

The invention relates to automobile parking and storing structures and devices.

An object of the present invention is to provide an automobile parking and storing arrangement wherein a large number of automobiles may be parked or stored on a small amount of ground space.

Another object of the invention is to provide an automobile parking and storing mechanism of the character described, wherein the automobiles will be readily accessible, notwithstanding their compact arrangement in the mechanism, and a single attendant may take care of a large number of automobiles, and quickly and readily move any of the automobiles so parked out of the mechanism.

A further object of the invention is to provide an automobile parking and storing mechanism of the character described, wherein each of the automobiles will be provided with an individual enclosure affording complete protection therefor and absolutely preventing accidental collision of the automobiles while being moved to and from their parked positions.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a plan view of a parking and storing mechanism constructed in accordance with the present invention.

Figure 2 is a longitudinal cross-sectional view of one of the automobile supporting cars used in the mechanism.

The automobile parking and storing mechanism of the present invention and as illustrated in the accompanying drawing comprises briefly a conveyer means having a plurality of allocated portions onto and from which automobiles may be driven, and means for driving and stopping the conveyer means so as to successively position said portions at loading and unloading stations.

With reference more specifically to the accompanying drawing, the form of the invention here depicted is especially designed for parking of a maximum number of automobiles in a relatively long and narrow floor space. As here shown, the floor space is defined by an elongated floor area 3 bounded by a substantially continuous side wall or track 4. Provided at one end 6 of the floor space in spaced transverse positions are loading and unloading stations 7 and 8 over which automobiles may be run to and from the floor area. A centrally positioned elongated endless conveyer 9 is mounted in the floor area and supported at its opposite ends upon wheels 11 and 12, the former being motivated by an electric motor 13 connected through a gear box 14 for driving the conveyer. Positioned between the sides of the conveyer and the surrounding wall 4 are a plurality of cars or supporting units 16 which are constructed, as will be seen in Figure 2, with an open end 17 through which an automobile may be driven and are supported on the floor 3 by means of a plurality of castor wheels 19. As will be seen from Figure 1, the forward end 17 of the cars is connected to the conveyer at the front corner of the car adjacent to the conveyer and a follower 22 is positioned at the rear corner of the outside 23 of the car to engage and be guided by the surrounding wall or rail 4. The wall 4 is especially curved at the opposite ends 6 and 24 of the floor area so as to cause the proper movement of the cars around wheels 11 and 12 as seen adjacent the end 6 of the apparatus.

I claim:

1. An automobile parking and storing mechanism comprising a plurality of cars having an open end into and from which automobiles may be driven, an elongated substantially horizontally extending endless conveyer, means connecting one side of said cars to said conveyer adjacent a forward corner of said cars for movement thereof around a closed path to successively position said cars at a loading station, guide means extending around said path, followers adjacent a rear corner of said cars and diagonally opposite to said connecting means and engageable with said guide means, and means for driving said conveyer.

2. An automobile parking and storing mechanism comprising, a plurality of horizontally spaced platform portions, a runway for automobiles leading to one of said platform portions, a plurality of cars having wheel supports for supporting the cars on said platform portions for movement therealong and having an open end into and from which automobiles may be driven, endless conveyer means positioned intermediate said portions and connected to said cars at a forward corner thereof and adapted to move same from one to the other of said platform portions and to tow said cars along said platform portions to and from said runway, and guide means positioned at the outer edges of said platforms and engaging said cars at a rear corner thereof diagonally opposite to the connection of said conveyer means thereto.

MALCOLM E. MITCHELL.